United States Patent
Konno et al.

[11] Patent Number: 5,852,749
[45] Date of Patent: Dec. 22, 1998

[54] VIBRATION REDUCTION DEVICE

[75] Inventors: Norikatsu Konno, Tokyo; Shoei Nakamura, Yokohama, both of Japan

[73] Assignee: Nikon Corporation, Tokyo, Japan

[21] Appl. No.: 852,573

[22] Filed: May 7, 1997

Related U.S. Application Data

[63] Continuation of Ser. No. 715,380, Sep. 12, 1996, abandoned.

[30] Foreign Application Priority Data

Sep. 13, 1995 [JP] Japan ................................. 7-235019

[51] Int. Cl.$^6$ ................................................ G03B 17/00
[52] U.S. Cl. ............................................................. 396/55
[58] Field of Search ................................. 396/55, 52–54; 348/208; 359/554–559

[56] References Cited

U.S. PATENT DOCUMENTS

| | | | |
|---|---|---|---|
| 5,220,375 | 6/1993 | Ishida et al. | 396/55 |
| 5,335,042 | 8/1994 | Imafuji et al. | 396/55 |
| 5,534,967 | 7/1996 | Matsuzawa | 396/55 |
| 5,561,498 | 10/1996 | Sekine et al. | 396/55 |

FOREIGN PATENT DOCUMENTS

| | | |
|---|---|---|
| 4-301882 | 10/1992 | Japan . |
| 5-66451 | 3/1993 | Japan . |
| 7-120801 | 5/1995 | Japan . |

*Primary Examiner*—W. B. Perkey
*Attorney, Agent, or Firm*—Staas & Halsey

[57] ABSTRACT

A vibration reduction device includes a vibration detection device for detecting vibrations, a vibration reduction optical system for reducing the vibrations by its movement, a vibration reduction optical system drive device for driving the vibration reduction optical system on the basis of the detection result of the vibration detection device, a memory device for storing a predetermined frequency region, a comparison device for comparing the stored frequency region with the frequency of the vibrations detected by the vibration detection device, a lock device for locking the operation of the vibration reduction optical system, and a control device for controlling the lock device on the basis of the comparison result of the comparison device.

28 Claims, 13 Drawing Sheets

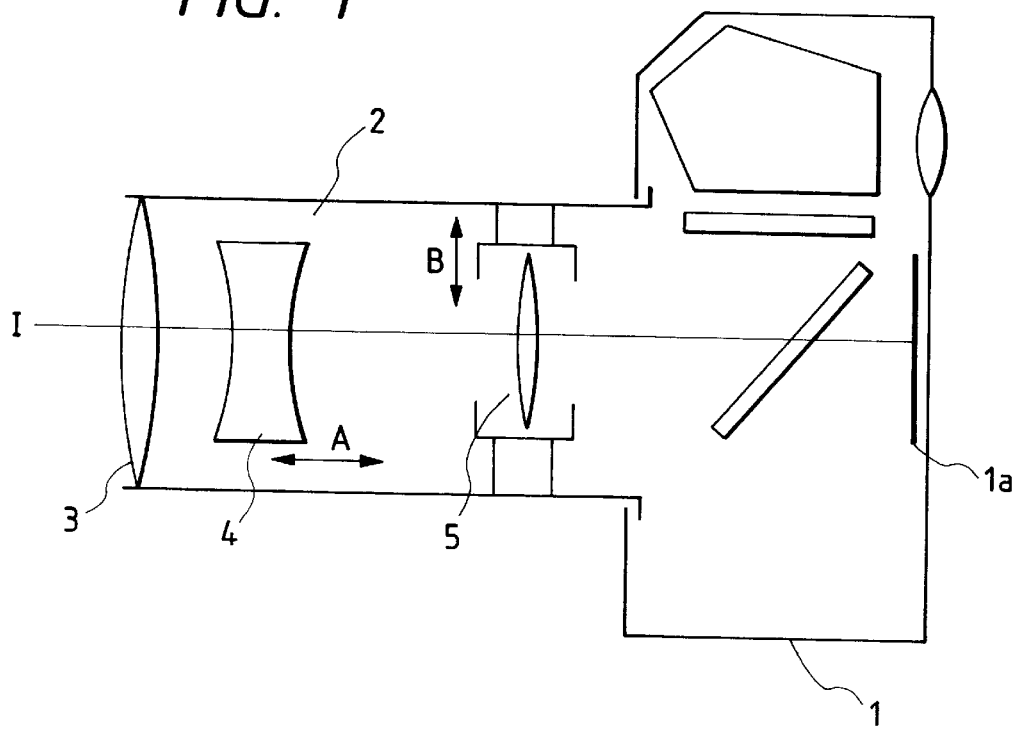
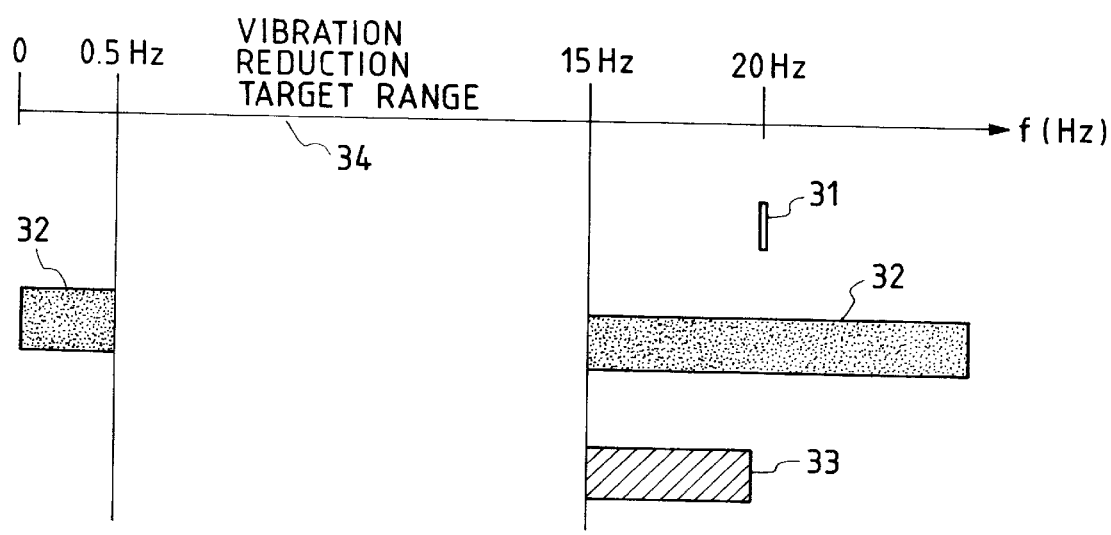

VIBRATION REDUCTION DEVICE

This application is a continuation of application Ser. No. 08/715,380, filed Sep. 12, 1996, now abandoned.

BACKGROUND OF THE INVENTION

1. Field of the Invention

The present invention relates to a vibration reduction device which is built in an optical apparatus such as a camera, a video camera, binoculars, a telescope, and the like, and reduces image vibrations by utilizing a two-dimensional movement mechanism that moves two-dimensionally.

2. Related Background Art

In recent years, a vibration reduction mechanism for reducing vibrations of the optical axis generated due to, e.g., camera shake is arranged in an optical apparatus such as a camera, a video camera, binoculars, a telescope, and the like.

In the case of a camera, the vibration reduction mechanism normally utilizes a two-dimensional movement mechanism. More specifically, the vibration reduction mechanism is built in a vibration reduction optical system of the camera, and prevents generation of image vibrations by moving some components of the vibration reduction optical system in a direction opposite to the vibration direction in a plane perpendicular to the optical axis.

FIG. 14 is a partial perspective view of a drive unit of the vibration reduction mechanism.

A vibration reduction lens 55 is held in a state wherein the lens 55 is fitted in the central portion of a rectangular lens frame 56 having four projecting portions, as shown in FIG. 14. Coils 62 and 66 of voice coil motors are fixed to two out of the four projecting portions formed on the lens frame 56, which is moved two-dimensionally, i.e., in directions BY and BX, by these voice coil motors.

One-end portions of four elastic wires 58, 59, 60, and 61 are perpendicularly fixed at four positions symmetrical about the center of the lens frame 56, and the other-end portions of these four wires 58, 59, 60, and 61 are fixed to an annular base member 63 to extend parallel to each other.

When the voice coil motors are driven, the lens frame 56 moves two-dimensionally, i.e., in substantially the directions BY and BX, while flexing the four wires 58, 59, 60, and 61.

However, in the vibration reduction mechanism shown in FIG. 14, when the lens frame 56 that holds the vibration reduction lens 55 is driven at a frequency close to the resonance frequency (natural frequency) of the vibration reduction mechanism, which frequency is determined by the spring constant determined by all the wires 58, 59, 60, and 61 as elastic members, and the total mass determined by the vibration reduction lens 55, the lens frame 56, and the coils 62 and 66, the vibration reduction mechanism resonates.

When the vibration reduction mechanism resonates during its operation, the amplitude increases very much, and for example, the lens frame 56 that holds the vibration reduction lens 55 may collide against the surrounding members and may be damaged.

Even when vibrations with a large amplitude which is out of the reduction range of the vibration reduction mechanism are input, in other words, even when vibrations beyond the performance of the vibration reduction optical system drive device are input, since the vibration reduction mechanism shown in FIG. 14 has no operation suppression mechanism, the vibration reduction optical system may become uncontrollable due to movement beyond its performance, thus worsening image vibrations on the image taking frame.

SUMMARY OF THE INVENTION

A vibration reduction device according to the first mode of the present invention comprises a vibration detection device for detecting a vibration generated in an optical apparatus, a vibration reduction optical system for reducing the vibration by its movement, a vibration reduction optical system drive device for driving the vibration reduction optical system, a memory device for storing a predetermined frequency region, a comparison device for comparing the stored frequency region with a frequency detected by the vibration detection device, a lock device for locking an operation of the vibration reduction optical system, and a control device for controlling the lock device on the basis of a comparison result of the comparison device.

According to the second mode of the present invention, in the vibration reduction device of the first mode, the memory device stores a resonance frequency of a vibration reduction mechanism, which frequency is determined by a mass of the vibration reduction optical system and a spring constant of an elastic member that supports the vibration reduction optical system, and the control device controls the lock device to lock the operation of the vibration reduction optical system when the frequency of the vibration detected by the vibration detection device approaches the resonance frequency.

According to the third mode of the present invention, in the vibration reduction device of the first mode, the control device locks the vibration reduction optical system when a drive frequency of the vibration reduction optical system is a resonance frequency determined by a mass of the vibration reduction optical system and a spring constant of an elastic member that supports the vibration reduction optical system.

According to the fourth mode of the present invention, in the vibration reduction device of the first mode, the control device locks the vibration reduction optical system when the frequency of the vibration detected by the vibration detection device is a resonance frequency determined by a mass of the vibration reduction optical system and a spring constant of an elastic member that supports the vibration reduction optical system.

According to the fifth mode of the present invention, in the vibration reduction device of the first mode, the control device locks the vibration reduction optical system when it is determined that a drive frequency of the vibration reduction optical system has approached a resonance frequency determined by a mass of the vibration reduction optical system and a spring constant of an elastic member that supports the vibration reduction optical system.

According to the sixth mode of the present invention, in the vibration reduction device of the first mode, the control device locks the vibration reduction optical system when the frequency of the vibration detected by the vibration detection device is a frequency other than the frequency stored in the memory device.

According to the seventh mode of the present invention, in the vibration reduction device of the sixth mode, the frequency stored in the memory device is a frequency at which the vibration reduction optical system drive device can drive the vibration reduction optical system.

According to the eighth mode of the present invention, in the vibration reduction device of the first mode, the control device locks the vibration reduction optical system when a drive frequency of the vibration reduction optical system is a frequency other than the frequency stored in the memory device.

According to the ninth mode of the present invention, in the vibration reduction device of the eighth mode, the frequency stored in the memory device is a frequency at which the vibration reduction optical system drive device can drive the vibration reduction optical system.

BRIEF DESCRIPTION OF THE DRAWINGS

FIG. 1 is a sectional view illustrating a camera with a built-in vibration reduction mechanism;

FIG. 3 is a graph showing the vibration reduction target range according to an embodiment of the present invention;

DETAILED DESCRIPTION OF THE PREFERRED EMBODIMENTS

Figure 2:
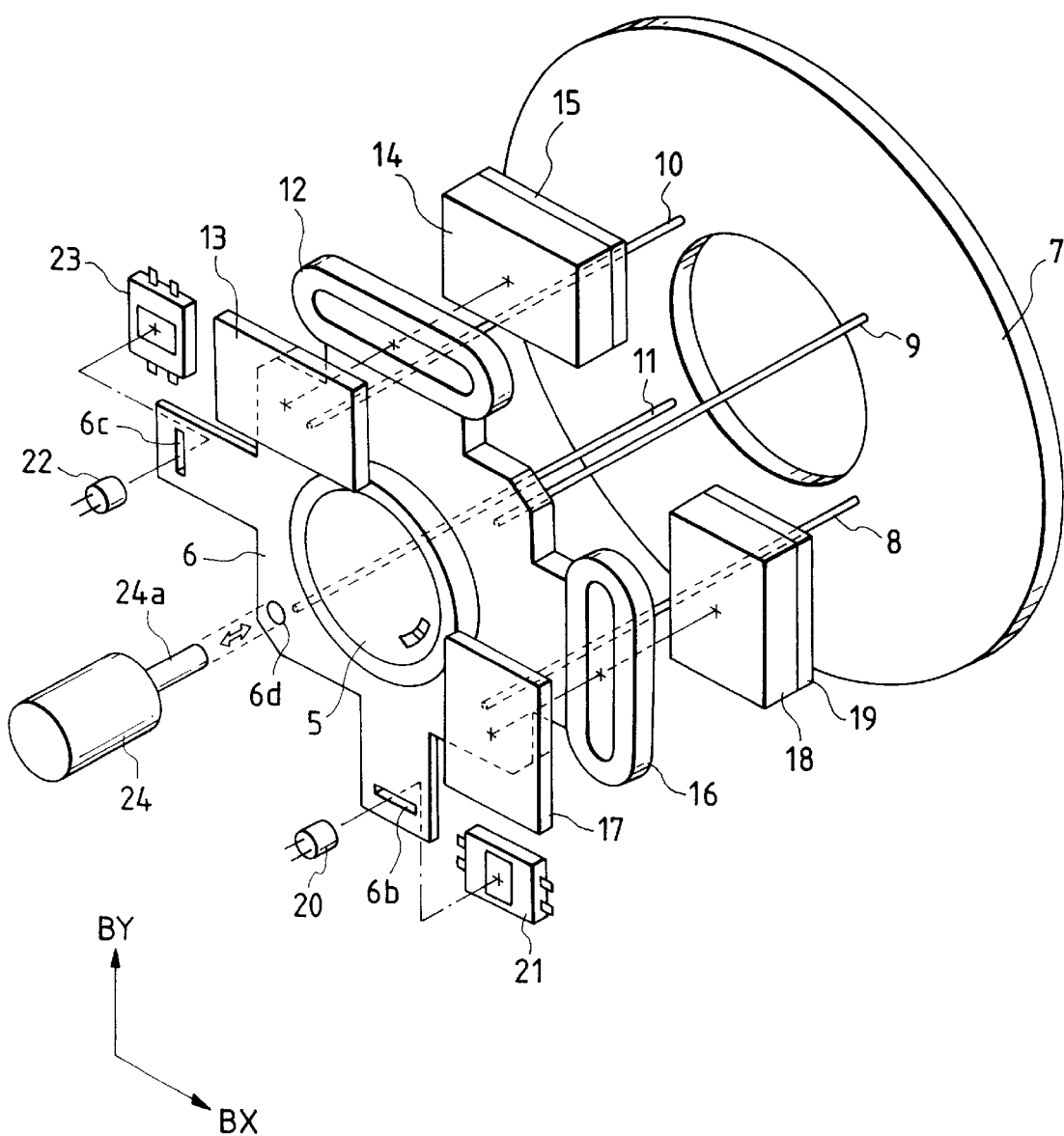
FIG. 2 is an exploded perspective view of a vibration reduction mechanism for translating a vibration reduction lens in a plane perpendicular to the optical axis.

The present invention will be described in detail hereinafter with reference to embodiments illustrated in the accompanying drawings.

FIG. 1 is a sectional view illustrating a camera with a built-in vibration reduction mechanism.

A lens 2 is mounted on a camera 1. The lens 2 is constituted by a first lens unit 3, a second lens unit 4 which moves in the same direction (in the direction of an arrow A) as the direction of an optical axis I to perform focusing so as to form an object image on an image surface 1a in the camera 1, and a third lens unit 5 (vibration reduction lens) which two-dimensionally moves in a plane perpendicular to the direction of the optical axis I (in a plane including the direction of an arrow B) to reduce image vibrations.

FIG. 2 is an exploded perspective view of a vibration reduction mechanism which translates the vibration reduction lens 5 in the plane perpendicular to the optical axis I.

Referring to FIG. 2, the vibration reduction lens 5 is fixed in a state wherein the lens 5 is fitted in the central portion of a substantially square lens frame 6 having four projecting portions.

Wire-shaped holding members 8, 9, 10, and 11 consisting of four spring materials are fixed to the lens frame 6 at four positions symmetrical about the center of the lens frame 6 so as to extend perpendicularly to the surface of the lens frame 6. The holding members 8, 9, 10, and 11 hold the lens frame 6 to be free to translate in either a direction BY or BX.

In this manner, one-end portions of the holding members 8, 9, 10, and 11 are fixed to the lens frame 6, and the other-end portions are fixed to an annular base member 7, so that these wires extend parallel to each other.

With this structure, the lens frame 6 is held by the base member 7 via the holding members 8, 9, 10, and 11 to be free to translate in either the direction BY or BX.

A voice coil 16 for the direction BX and a voice coil 12 for the direction BY are respectively fixed to the two projecting portions of the lens frame 6.

The voice coil 12 is located between a yoke 13 disposed on the back side of the lens frame 6 with respect to the base member 7, and a yoke 15 and a permanent magnet 14, which are disposed on the side, facing the lens frame 6, of the base member 7. Note that the voice coil 12 and the yokes 13 and 15 are separated from each other.

In this manner, the voice coil 12, the yoke 13, the permanent magnet 14, and the yoke 15 constitute a voice coil motor. When a current is supplied to the voice coil 12, the voice coil 12 receives a force associated with the direction BY and drives the lens frame 6 in the direction BY, thereby driving the vibration reduction lens 5 held by the lens frame 6 in the direction BY. Note that the drive method may use a motor other than the voice coil motor, e.g., a linear motor.

Likewise, the voice coil 16 is located between a yoke 17 disposed on the back side of the lens frame 6 with respect to the base member 7, and a yoke 19 and a permanent magnet 18, which are disposed on the side, facing the lens frame 6, of the base member 7, thus constituting another voice coil motor. The voice coil 16 is disposed between the yoke 17, and the permanent magnet 18 and the yoke 19, and when a current is supplied to the voice coil 16, the voice coil 16 receives a force associated with the direction BX, and the vibration reduction lens 5 is driven in the direction BX. Note that the drive method may use a motor other than the voice coil motor, e.g., a linear motor.

In order to detect the moving amount of the vibration reduction lens 5 with the above arrangement, a slit 6b in the direction BX and a slit 6c in the direction BY are respectively formed on the two remaining projecting portions of the lens frame 6.

An LED 20 is disposed at one surface side of the projecting portion, formed with the slit 6b, of the lens frame 6, and a PSD 21 is disposed at the other surface side thereof to be paired with the LED 20. Light emitted by the LED 20 reaches the PSD 21 via the slit 6b.

Therefore, as the lens frame 6 moves, the position of light that reaches the PSD 21 moves and the output signal from the PSD 21 changes. With this change in output signal, the current position, in the direction BY, of the lens frame 6 can be detected.

An LED 22 is disposed at one surface side of the projecting portion, formed with the slit 6c, of the lens frame 6, and a PSD 23 is disposed at the other surface side thereof to be paired with the LED 22. Light emitted by the LED 22 reaches the PSD 23 via the slit 6c.

Therefore, the current position, in the direction BY, of the lens frame 6 can be detected based on changes in output signal from the PSD 23 in the same manner as in the direction BX.

Furthermore, a recess portion 6d is formed on the lens frame 6 so as to lock the vibration reduction lens 5 held by the lens frame 6, and a latch solenoid 24 is fixed at a position opposing the recess portion 6d.

The latch solenoid 24 inserts a retractable plunger 24a into the recess portion 6d of the lens frame 6 to disable any movement of the lens frame 6, thereby locking the lens frame 6.

The camera with the built-in vibration reduction mechanism of this embodiment has the above-mentioned arrangement.

The frequency of vibrations caused by camera shake of a photographer normally falls within the range from 0.5 to 15 Hz. Hence, in this embodiment, the vibration reduction target range of the built-in vibration reduction mechanism is set to fall within the range between 0.5 Hz (inclusive) and 15 Hz (inclusive), and the range between 0 Hz (inclusive) and 0.5 Hz (exclusive), and the range exceeding 15 Hz are set to be out of the vibration reduction target range, as shown in the graph of FIG. 3. This target range can be changed by changing the memory contents in a memory circuit 43a.

In this embodiment, a resonance frequency f determined by the spring constant determined by all the wires (holding members) 8, 9, 10, and 11 as elastic members, and the total mass determined by the vibration reduction lens 5, the lens frame 6, and the voice coils 12 and 16 is set to be 20 Hz. Note that the resonance frequency f is determined by equation (1) below:

$$\text{Resonance frequency } f = (k/m)^{1/2}/2\pi \quad (1)$$

where m: the total mass of the image vibration reduction lens 5, the lens frame 6, and the coils 12 and 16 k: the spring constant of the wires

π: the ratio of circumference of circle to its diameter

Figure 4:
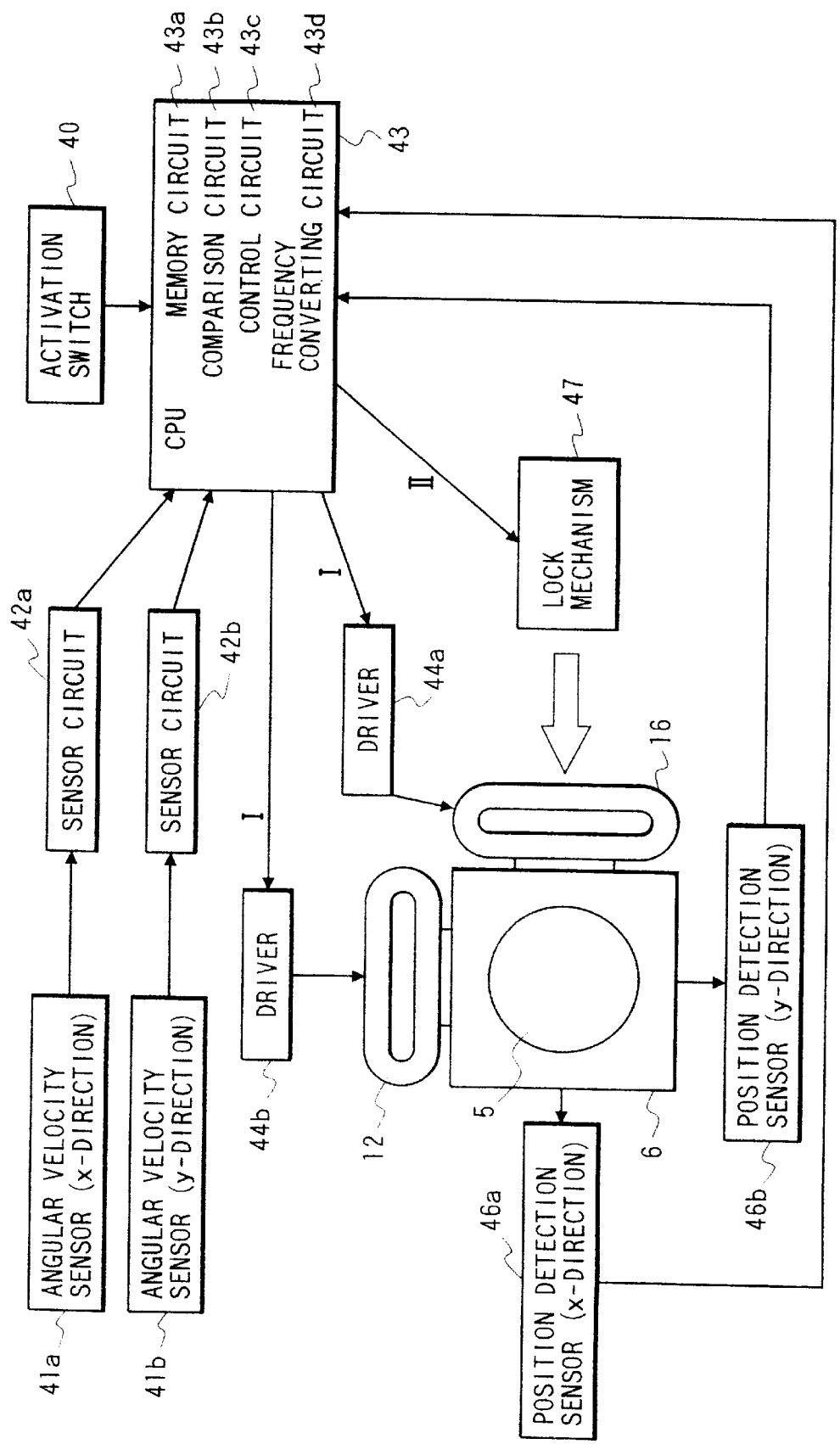
FIG. 4 is an explanatory view showing the basic flow of control of the camera with the built-in vibration reduction mechanism in the embodiment shown in FIG. 3.

FIG. 4 is an explanatory view showing the basic flow of control of the camera with the built-in vibration reduction mechanism of this embodiment.

Referring to FIG. 4, when an activation switch 40 is turned on, data of vibrations of the camera, which are detected by an angular velocity sensor (x-direction) 41a and an angular velocity sensor (y-direction) 41b, are input to a CPU 43 via sensor circuits 42a and 42b each including an amplifier, a filter, and the like.

In the CPU 43, the frequency of vibrations is calculated by a known processing method such as fft on the basis of the input signals. In the CPU 43, when the detected frequency falls within the above-mentioned vibration reduction target range, control I for reducing image vibrations is performed; when the detected frequency is out of the vibration reduction target range, control II of a lock mechanism 47 is performed.

Furthermore, in the CPU 43, when the frequency calculated by processing signals from a position detection sensor (x-direction) 46a and a position detection sensor (y-direction) 46b by a frequency converting circuit 43d is out of the vibration reduction target range, the lock mechanism 47 is controlled. In this embodiment, the PSDs 21 and 23 shown in FIG. 1 are respectively used as the position detection sensor (x-direction) 46a and the position detection sensor (y-direction) 46b.

A control circuit 43c in the CPU 43 controls the lock mechanism 47 to lock the vibration reduction mechanism in the following cases (operation condition 1) to (operation condition 6).

(Operation Condition 1)

Signals of vibrations of the camera respectively detected by the angular velocity sensor (x-direction) 41a and the angular velocity sensor (y-direction) 41b are input to the CPU 43 via the sensor circuits 42a and 42b each including an amplifier, a filter, and the like.

Figure 5:
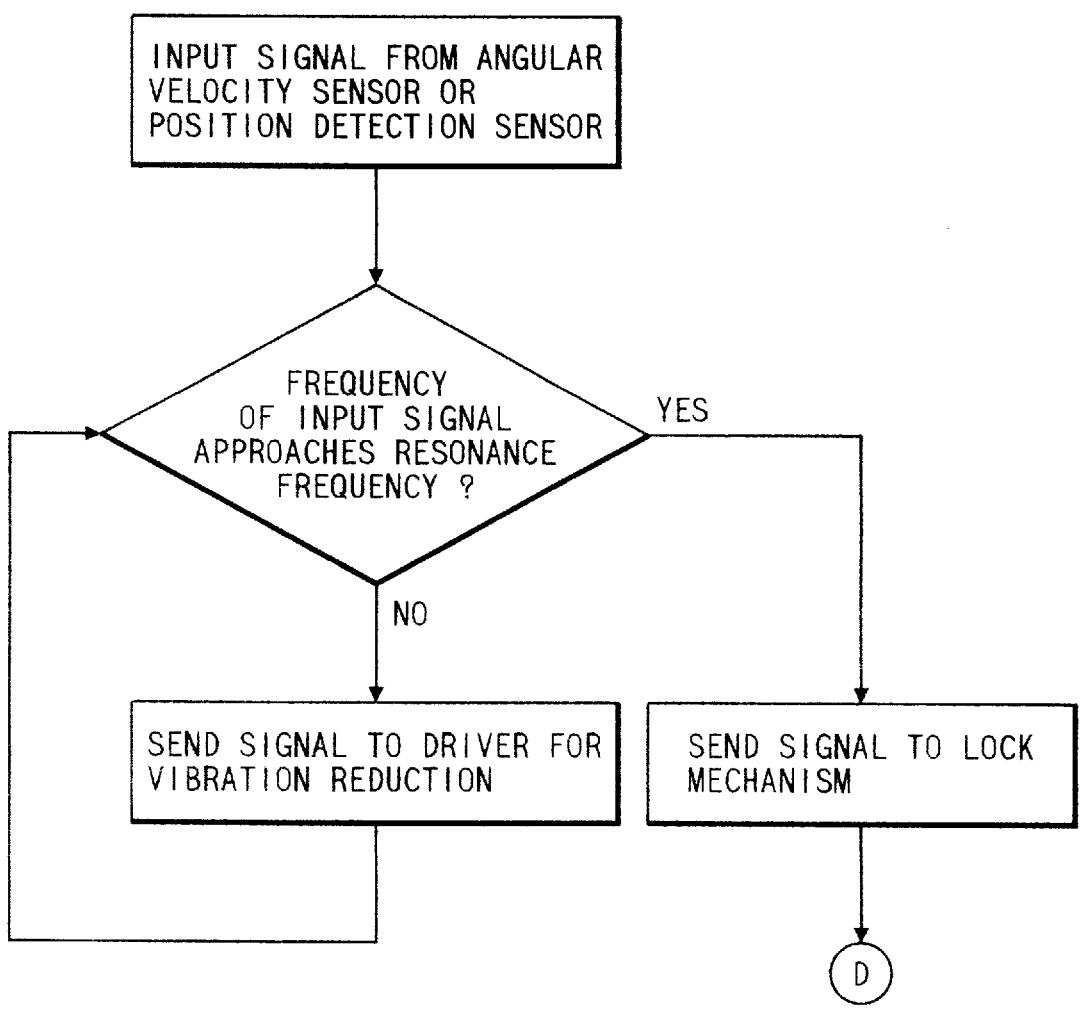
FIG. 5 is a flow chart showing an example of the process used in a CPU of the embodiment shown in FIG. 3.

At this time, in the CPU 43, a case wherein the frequency obtained based on the input signals from the angular velocity sensor (x-direction) 41a and the angular velocity sensor (y-direction) 41b approaches the resonance frequency, as described in the flow chart shown in FIG. 5, means a case wherein the frequency obtained based on the input signals falls within a region 33 in FIG. 3 and approaches a frequency of 20 Hz. If a comparison circuit 43b determines that the frequency obtained based on the input signals has approached the resonance frequency stored in a memory circuit 43a, a control signal II is supplied to the lock mechanism 47 to lock the vibration reduction mechanism.

(Operation Condition 2)

The position signals detected by the PSDs 21 and 23 are converted into a frequency by utilizing the frequency converting circuit 43d. As shown in the flow chart in FIG. 6, the comparison circuit 43b checks if the converted frequency is substantially equal to the resonance frequency stored in the memory circuit 43a. When in the affirmative, i.e., if the converted frequency falls within a region 31 shown in FIG. 3, it is determined that the camera has resonated, and a control signal II is supplied to the lock mechanism 47 to lock the vibration reduction mechanism. On the other hand, if it is determined that the converted frequency is substantially not equal to the resonance frequency, it is determined that image vibration reduction is to be performed, and a control signal I is supplied to drivers 44a and 44b.

(Operation Condition 3)

Signals of vibrations of the camera respectively detected by the angular velocity sensor (x-direction) 41a and the angular velocity sensor (y-direction) 41b are input to the CPU 43 via the sensor circuits 42a and 42b each including an amplifier, a filter, and the like.

Figure 6:
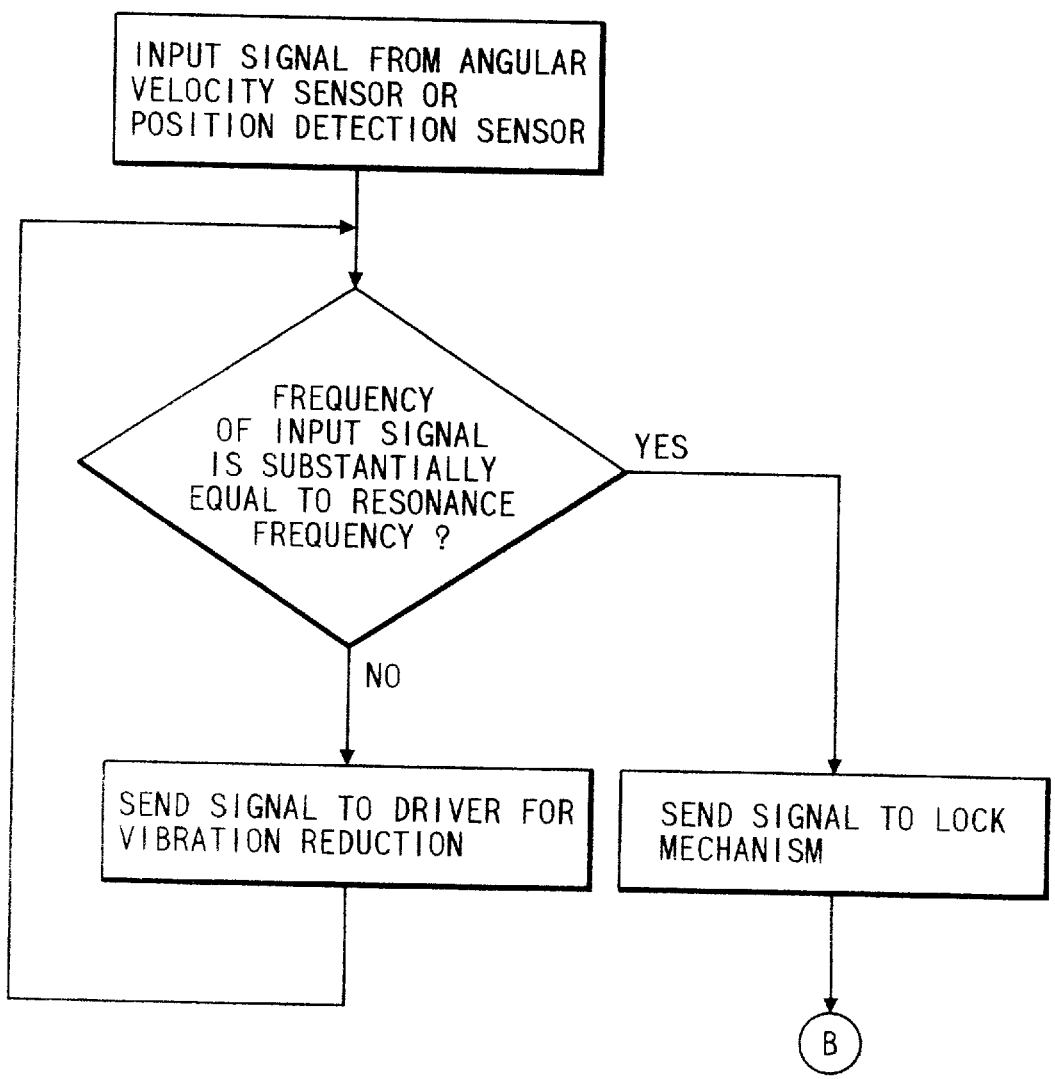
FIG. 6 is a flow chart showing an example of the process used in the CPU of the embodiment shown in FIG. 3.

At this time, the comparison circuit 43b checks if the frequency of vibrations, which is calculated by a known method such as fft on the basis of the input frequency in the CPU 43 is substantially equal to the resonance frequency of the vibration reduction mechanism stored in the memory circuit 43a, as shown in the flow chart in FIG. 6. When in the affirmative, i.e., if the calculated frequency falls within the region 31 in FIG. 3, it is determined that the camera has resonated, and a control signal II is supplied to the lock mechanism 47 to lock the vibration reduction mechanism. On the other hand, if it is determined that the calculated frequency is substantially not equal to the resonance frequency, it is determined that image vibration reduction is to be performed, and the control signal I is supplied to the drivers 44a and 44b.

(Operation Condition 4)

The position signals detected by the PSDs 21 and 23 are converted into a frequency by utilizing the frequency converting circuit 43d. As shown in the flow chart in FIG. 5, the comparison circuit 43b checks if the converted frequency has approached the resonance frequency. When in the affirmative, i.e., if the comparison circuit 43b determines that the converted frequency falls within the region 33 shown in FIG. 3 and has approached a resonance frequency of 20 Hz stored in the memory circuit, a control signal II is supplied to the lock mechanism 47 to lock the vibration reduction mechanism. On the other hand, if it is determined that the converted frequency has not approached the resonance frequency, it is determined that image vibration reduction is to be performed, and a control signal I is supplied to the drivers 44a and 44b.
(Operation Condition 5)

Signals of vibrations of the camera respectively detected by the angular velocity sensor (x-direction) 41a and the angular velocity sensor (y-direction) 41b are input to the CPU 43 via the sensor circuits 42a and 42b each including an amplifier, a filter, and the like.

Figure 7:
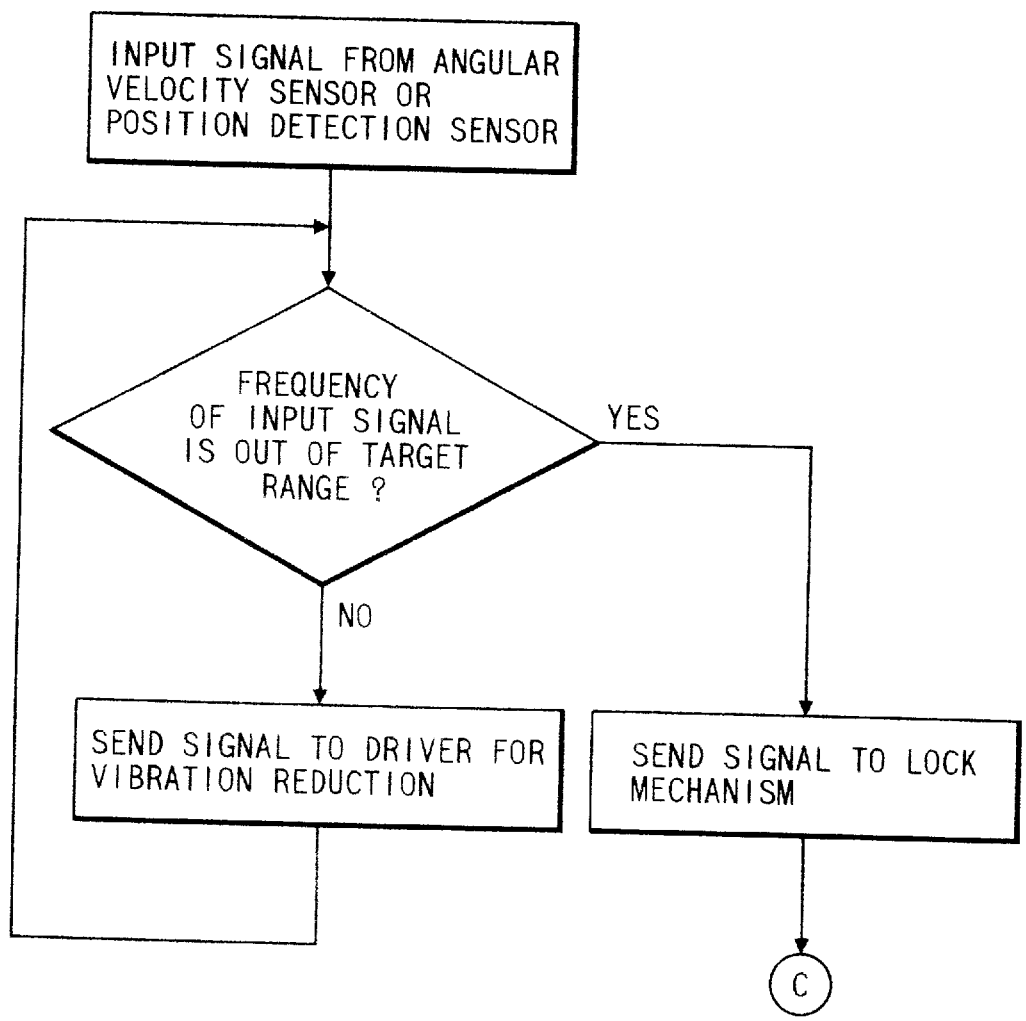
FIG. 7 is a flow chart showing an example of the process used in the CPU of the embodiment shown in FIG. 3.

At this time, the comparison circuit 43b checks if the frequency of vibrations, which is calculated by a known method such as fft on the basis of the input frequency in the CPU 43 is out of the vibration reduction control target frequency range, as shown in the flow chart in FIG. 7. When in the affirmative, i.e., if the calculated frequency falls within a region 32 shown in FIG. 3, a control signal II is supplied to the lock mechanism 47 to lock the vibration reduction mechanism. When in the negative, i.e., if the frequency of vibrations falls within the vibration reduction control target frequency range, it is determined that image vibration reduction is to be performed, and a control signal I is supplied to the drivers 44a and 44b. Note that the vibration reduction control target frequency range is stored in the memory circuit 43a. This method can also be applied to a method of moving the optical system along a rail free from any resonance frequency, a method of floating the optical system by a magnetic force, and the like in addition to the method of supporting the optical system using the wires.
(Operation Condition 6)

The position signals detected by the PSDs 21 and 23 are converted into a frequency by utilizing the frequency converting circuit 43d. As shown in the flow chart in FIG. 7, the comparison circuit 43b checks if the converted frequency is out of the vibration reduction control target frequency range. When in the affirmative, i.e., if the changed frequency falls within the region 32 in FIG. 3, a control signal II is supplied to the lock mechanism 47 to lock the vibration reduction mechanism. When in the negative, i.e., when the frequency of vibrations falls within the vibration reduction control target frequency range, it is determined that image vibration reduction is to be performed, and a control signal I is supplied to the drivers 44a and 44b. Note that the vibration reduction control target frequency range is stored in the memory circuit 43a.

Figure 8:
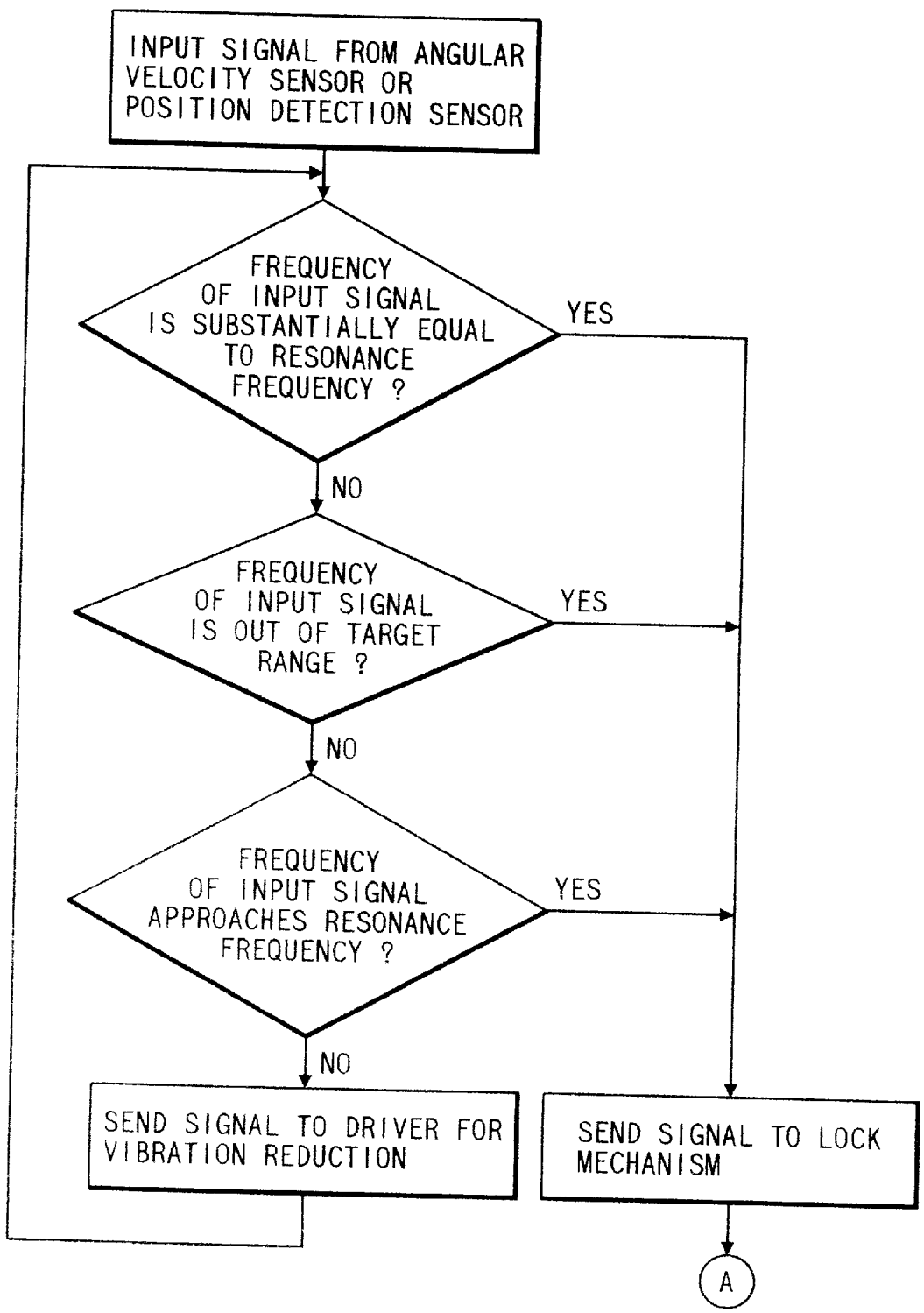
FIG. 8 is a flow chart showing an example of the process used in the CPU of the embodiment shown in FIG. 3.

The flow charts shown in FIGS. 5 to 7 are classified in correspondence with a case (i) wherein the frequency obtained based on the input signals from the angular velocity sensors or the position detection sensors is approaching the resonance frequency (FIG. 5), a case (ii) wherein the frequency obtained based on the input signals is substantially equal to the resonance frequency (FIG. 6), and a case (iii) wherein the frequency obtained based on the input signals is out of the control target frequency range (FIG. 7). However, these flow charts may be combined into one. FIG. 8 shows such flow chart. In FIG. 8, it is checked in turn if the frequency obtained based on the input signals is substantially equal to the resonance frequency, is out of the control target frequency range, and approaches the resonance frequency. When in the affirmative in one of these steps, a control signal II is supplied to the lock mechanism to lock the vibration reduction mechanism. When in the negative in all these steps, a control signal I is supplied to the drivers 44a and 44b.

In (operation condition 1) to (operation condition 6) described above, the control signal to be sent to the lock mechanism 47 corresponds to the control signal II in FIG. 4. While the control signal II is sent to the lock mechanism 47, a signal (center bias signal) for driving and holding the vibration reduction lens 5 at the central position is sent as the control signal I to be sent to a drive system, so that the vibration reduction lens 5 stands by at the center or a position in the vicinity of the center of the operation range.

The flow of unlocking the vibration reduction mechanism 47 will be explained below.

The locked state of the vibration reduction mechanism upon operation of the lock mechanism 47 is recognized when one or a plurality of (operation condition 1) to (operation condition 6) are satisfied. Therefore, when the activation switch 40 is kept ON and the lock condition described above in (operation condition 1) to (operation condition 6) is not satisfied, the vibration reduction mechanism is unlocked.

Figure 9:
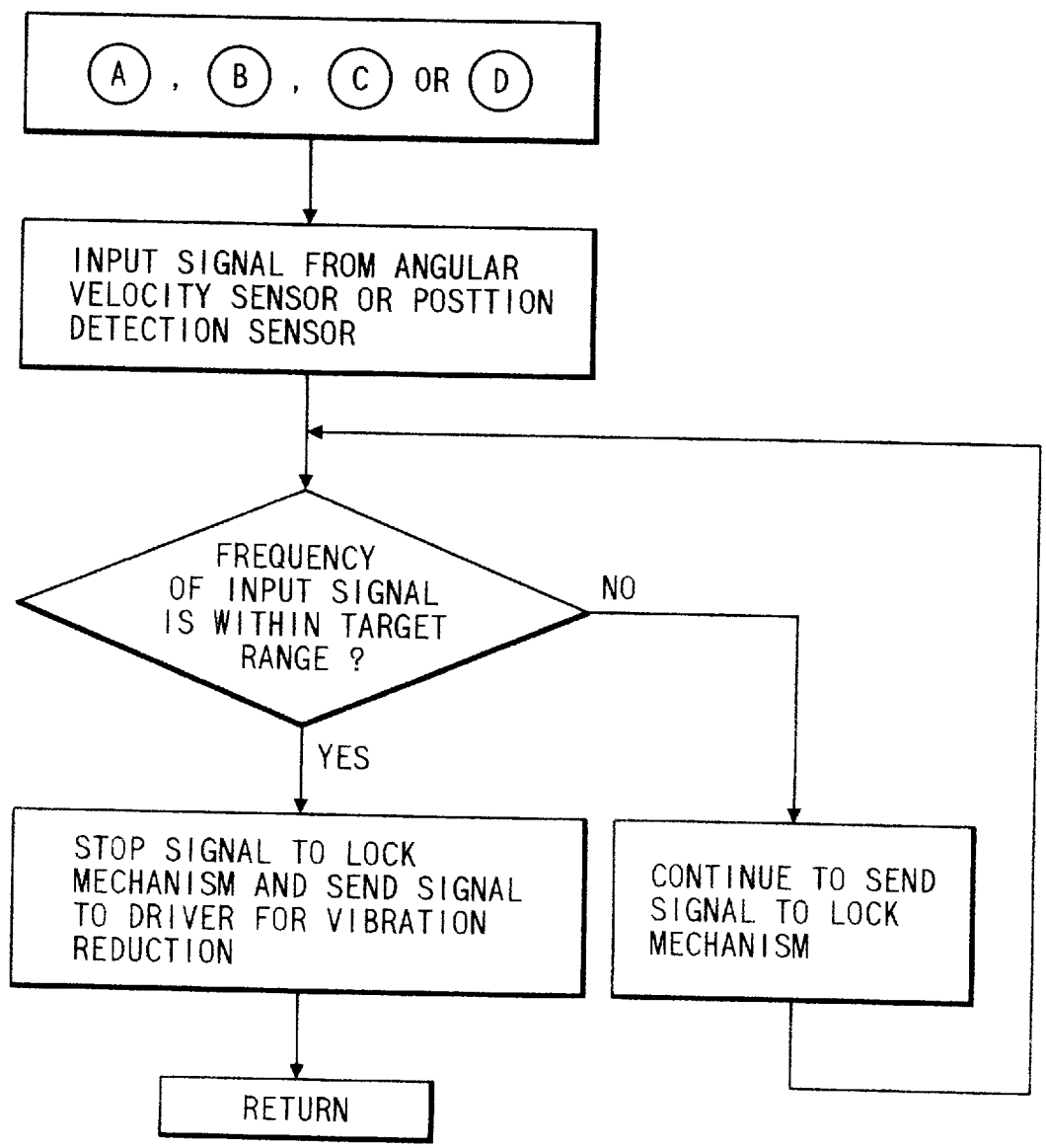
FIG. 9 is a flow chart showing an example of the process used in the CPU of the embodiment shown in FIG. 3.

As shown in the flow chart in FIG. 9, it is checked if the frequency obtained based on the signals from the angular velocity sensors 41a and 41b or the PSDs 21 and 23 has returned to fall within the vibration reduction target range (region 34 in FIG. 3). When in the affirmative, the control circuit stops the control signal II in FIG. 4, and determines that vibration reduction is to be performed. Hence, the control circuit supplies a control signal I to the drivers 44a and 44b of the vibration reduction mechanism. On the other hand, if the frequency obtained based on the input signals has not returned to the reduction target range, the control signal II continues to be sent to the lock mechanism 47.

As the method of unlocking the vibration reduction mechanism, the following methods having different discrimination conditions from that in the process shown in FIG. 9 may be used.
[When Operation Condition 2 or 3]

Figure 10:
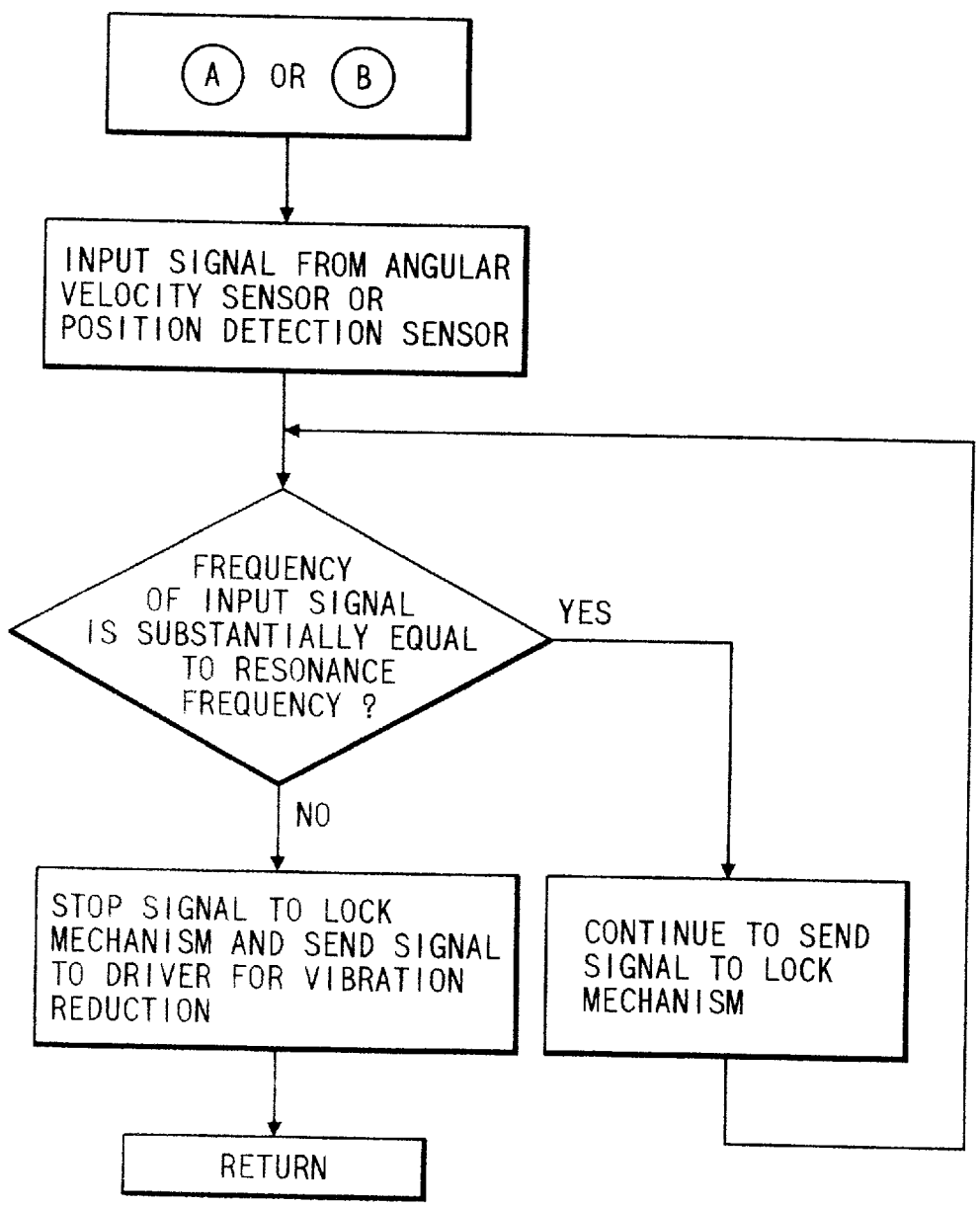
FIG. 10 is a flow chart showing an example of the process used in the CPU of the embodiment shown in FIG. 3.

As shown in FIG. 10, when it is determined that the frequency obtained based on the signals from the angular velocity sensors 41a and 41b or the PSDs 21 and 23 is substantially not equal to the resonance frequency, the control signal sent to the lock mechanism is stopped, and it is determined that image vibration reduction is to be performed. Hence, a control signal I is supplied to the drivers 44a and 44b.
[When Operation Condition 5 or 6]

Figure 11:
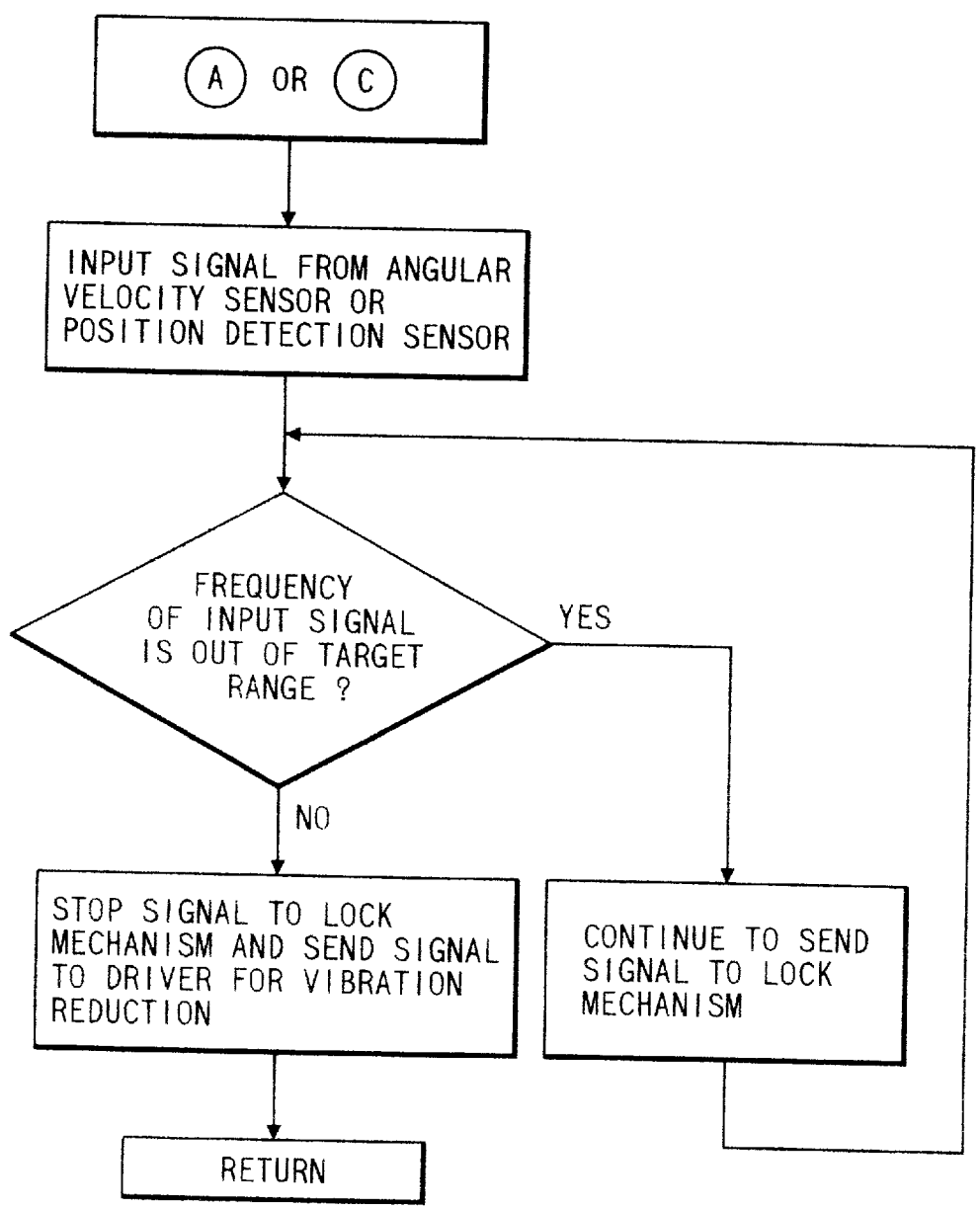
FIG. 11 is a flow chart showing an example of the process used in the CPU of the embodiment shown in FIG. 3.

As shown in the flow chart in FIG. 11, when it is determined that the frequency obtained based on the signals from the angular velocity sensors 41a and 41b or the PSDs 21 and 23 is not out of the control target frequency range, it is determined that vibration reduction is to be performed. Hence, the control signal II sent to the lock mechanism 47 is stopped, and a control signal I is supplied to the drivers 44a and 44b of the vibration reduction mechanism.
[When Operation Condition 1 or 4]

Figure 12:
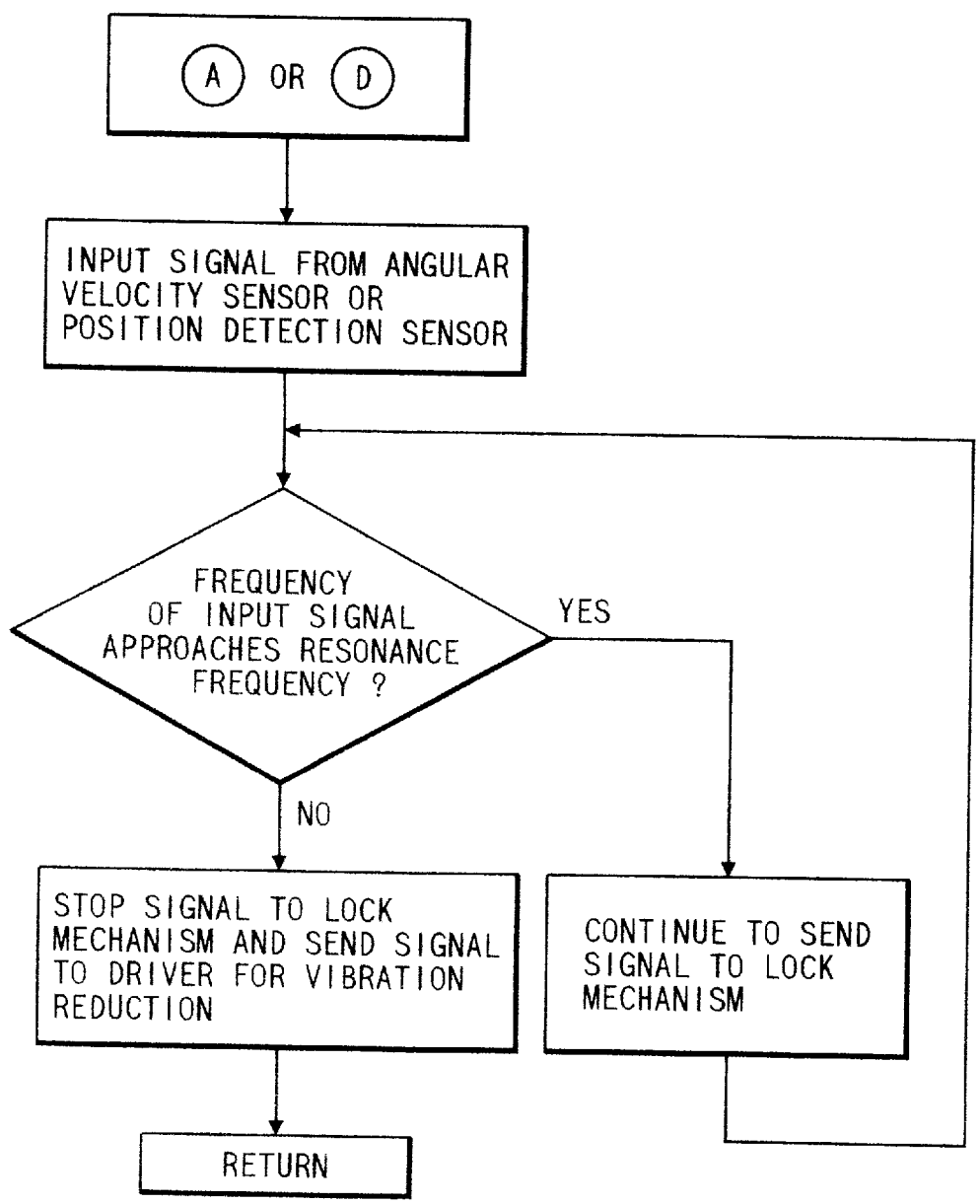
FIG. 12 is a flow chart showing an example of the process used in the CPU of the embodiment shown in FIG. 3.

As shown in the flow chart in FIG. 12, when it is determined that the frequency obtained based on the signals from the angular velocity sensors 41a and 41b or the PSDs 21 and 23 is no longer approaching the resonance frequency, it is determined that vibration reduction is to be performed. Hence, the control signal II sent to the lock mechanism 47 is stopped, and a control signal I is supplied to the drivers 44a and 44b of the vibration reduction mechanism.

Figure 13:
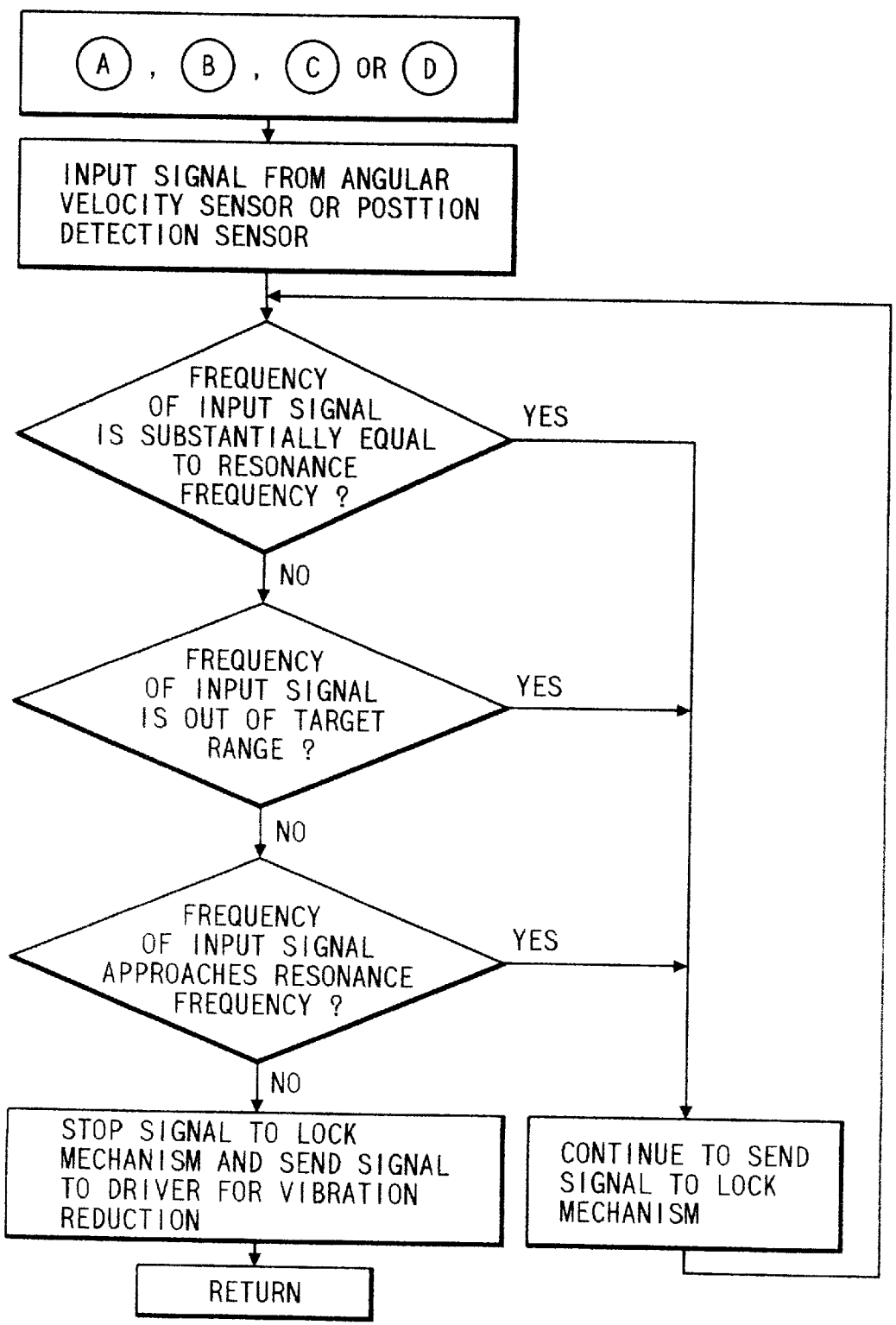
FIG. 13 is a flow chart showing an example of the process used in the CPU of the embodiment shown in FIG. 3.
Figure 14:
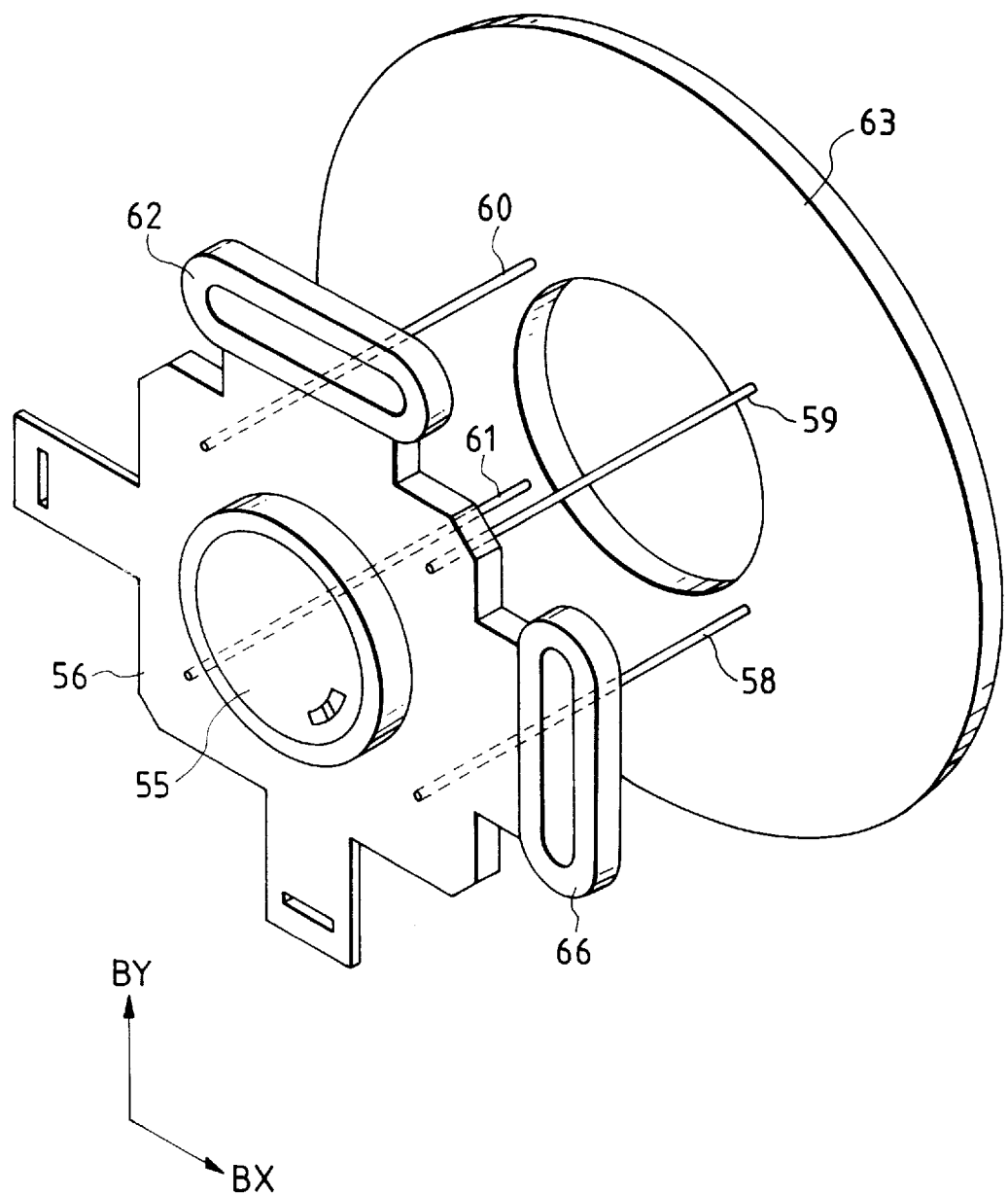
FIG. 14 is a partial perspective view of a drive mechanism of a vibration reduction mechanism.

Note that the methods of unlocking the vibration reduction mechanisms described above with reference to FIGS. 10 to 12 may be combined into one flow chart, as shown in FIG. 13. In the flow chart shown in FIG. 13, it is checked in turn if the frequency is substantially equal to the resonance frequency, is out of the control target frequency range, and approaches the resonance frequency.

With the above-mentioned embodiment, the resonance upon operation of the vibration reduction mechanism can be eliminated. For this reason, for example, the lens frame 6 that holds the vibration reduction lens 5 can be prevented from being damaged due to collision against other members.

With this embodiment, when large vibrations beyond the reduction control range of the vibration reduction mechanism are input, the vibration tracking operation (reduction operation) of the vibration reduction mechanism is suppressed, thus preventing an unnecessary operation.

What is claimed is:

1. A vibration reduction device comprising:
   a vibration detection device which detects a vibration;
   a vibration reduction optical system which reduces the vibration by its movement;
   a vibration reduction optical system drive device which drives said vibration reduction optical system on the basis of a detection result of said vibration detection device;
   a memory device which stores a predetermined frequency region;
   a comparison device which compares the stored frequency region with a frequency of the vibration detected by said vibration detection device;
   a lock device which locks an operation of said vibration reduction optical system; and
   a control device which controls said lock device on the basis of a comparison result of said comparison device.

2. A device according to claim 1, wherein said memory device stores a resonance frequency of a vibration reduction mechanism, which frequency is determined by a mass of said vibration reduction optical system and a spring constant of an elastic member that supports said vibration reduction optical system, and
   said control device controls said lock device to lock the operation of said vibration reduction optical system when the frequency of the vibration detected by said vibration detection device approaches the resonance frequency.

3. A device according to claim 1, wherein said control device locks said vibration reduction optical system when a drive frequency of said vibration reduction optical system is a resonance frequency determined by a mass of said vibration reduction optical system and a spring constant of an elastic member that supports said vibration reduction optical system.

4. A device according to claim 1, wherein said control device locks said vibration reduction optical system when the frequency of the vibration detected by said vibration detection device is a resonance frequency determined by a mass of said vibration reduction optical system and a spring constant of an elastic member that supports said vibration reduction optical system.

5. A device according to claim 1, wherein said control device locks said vibration reduction optical system when it is determined that a drive frequency of said vibration reduction optical system has approached a resonance frequency determined by a mass of said vibration reduction optical system and a spring constant of an elastic member that supports said vibration reduction optical system.

6. A device according to claim 1, wherein said control device locks said vibration reduction optical system when the frequency of the vibration detected by said vibration detection device is a frequency other than the frequency stored in said memory device.

7. A device according to claim 6, wherein the frequency stored in said memory device is a frequency at which said vibration reduction optical system drive device can drive said vibration reduction optical system.

8. A device according to claim 1, wherein said control device locks said vibration reduction optical system when a drive frequency of said vibration reduction optical system is a frequency other than the frequency stored in said memory device.

9. A device according to claim 8, wherein the frequency stored in said memory device is a frequency at which said vibration reduction optical system drive device can drive said vibration reduction optical system.

10. A vibration reduction device to be applied to an optical apparatus for forming an image, comprising:
    a vibration detection device which detects a vibration generated in said optical apparatus;
    a vibration reduction optical system which is movable to attain image vibration reduction;
    a vibration reduction optical system driving device which drives said vibration reduction optical system on the basis of a detection result of said vibration detection device;
    a memory device which stores a predetermined frequency;
    a comparison device which compares the stored frequency with a frequency of the vibration detected by said vibration detection device;
    a lock device which locks an operation of aid vibration reduction optical system; and
    a control device which controls said lock device on the basis of a comparison result of said comparison device.

11. A device according to claim 10, wherein said memory device stores a resonance frequency of a vibration reduction mechanism, which frequency is determined by a mass of said vibration reduction optical system and a spring constant of an elastic member that supports said vibration reduction optical system, and
    said control device controls said lock device to lock the operation of said vibration reduction optical system when the frequency of the vibration detected by said vibration detection device approaches the resonance frequency.

12. A device according to claim 10, wherein said control device locks said vibration reduction optical system when a drive frequency of said vibration reduction optical system is a resonance frequency determined by a mass of said vibration reduction optical system and a spring constant of an elastic member that supports said vibration reduction optical system.

13. A device according to claim 10, wherein said control device locks said vibration reduction optical system when the frequency of the vibration detected by said vibration detection device is a resonance frequency determined by a mass of said vibration reduction optical system and a spring constant of an elastic member that supports said vibration reduction optical system.

14. A device according to claim 10, wherein said control device locks said vibration reduction optical system when it is determined that a drive frequency of said vibration reduction optical system has approached a resonance frequency determined by a mass of said vibration reduction optical system and a spring constant of an elastic member that supports said vibration reduction optical system.

15. A device according to claim 10, wherein said control device locks said vibration reduction optical system when the frequency of the vibration detected by said vibration detection device is a frequency other than the frequency stored in said memory device.

16. A device according to claim 15, wherein the frequency stored in said memory device is a frequency at which said vibration reduction optical system drive device can drive said vibration reduction optical system.

17. A device according to claim 10, wherein said control device locks said vibration reduction optical system when a drive frequency of said vibration reduction optical system is a frequency other than the frequency stored in said memory device.

18. A device according to claim 17, wherein the frequency stored in said memory device is a frequency at which said vibration reduction optical system drive device can drive said vibration reduction optical system.

19. A vibration reduction method for an optical system having a vibration reduction optical system which reduces images vibration by its movement, comprising the steps of:
   detecting a vibration;
   driving said vibration reduction optical system on the basis of the detected vibration;
   comparing a frequency of the detected vibration with a predetermined frequency range;
   locking the driving of said vibration reduction optical system on the basis of the comparison result.

20. A vibration reduction method to be applied to an optical apparatus for forming an image having a vibration reduction optical system which is movable to attain image vibration reduction, comprising:
   detecting a vibration generated in said optical apparatus;
   driving said vibration reduction optical system on the basis of a detected vibration;
   comparing a frequency of the detected vibration with a predetermined frequency range;
   locking the driving of said vibration reduction optical system on the basis of the comparison result.

21. A method of reducing vibration of an optical apparatus including a vibration reduction optical system which reduces vibration by its movement, said method comprising:
   detecting a vibration;
   outputting a signal representing a value of a frequency of the vibration;
   driving the vibration reduction optical system based on the detected value;
   storing a certain frequency value in a memory;
   comparing said certain value with said output value; and
   locking said vibration reduction optical system;
   changing a holding state of a lock device based on said comparing.

22. A method of reducing vibration of an optical apparatus including a vibration reduction optical system that is movable to attain image vibration reduction, said method comprising:
   detecting a vibration;
   outputting a signal related to a frequency value of said vibration;
   driving the vibration reduction optical system based on the output value;
   storing a certain frequency value in a memory;
   comparing said certain value with said output value;
   using a holding device to hold said vibration reduction optical system at a predetermined position; and
   changing a holding state of said holding device based on said comparing.

23. A vibration reduction device comprising:
   a vibration detection device to detect a vibration and output a signal representing a frequency value related to the vibration;
   a vibration reduction optical system to reduce the vibration by movement thereof;
   a vibration reduction optical system drive device to drive said vibration reduction optical system on the basis of a detection result of said vibration detection device;
   a memory device to store a certain frequency value;
   a comparison device to compare the stored frequency value with said frequency value represented by said signal output by said vibration detection device;
   a lock device to lock said vibration reduction optical system; and
   a control device to change a locking state of said lock device on the basis of a comparison result of said comparison device.

24. A vibration reduction device according to claim 23, wherein said control device controls said vibration reduction optical system drive device to suspend the driving of said vibration reduction optical system.

25. A vibration reduction device comprising:
   a vibration detection device to detect a vibration and output a signal representing a frequency value related to the vibration;
   a vibration reduction optical system to reduce the vibration by it movement;
   a vibration reduction optical system drive device to drive said vibration reduction optical system on the basis of a detection result of said vibration detection device;
   a memory device to store a certain frequency value;
   a comparison device to compare the stored frequency value with said frequency value represented by said signal output by said vibration detection device;
   a holding device to hold said vibration reduction optical system at a predetermined position; and
   a control device to change a holding state of said holding device on the basis of a comparison result of said comparison device.

26. A vibration reduction device according to claim 25, wherein said control device controls said vibration reduction optical system drive device to suspend the driving of said vibration reduction optical system.

27. A vibration reduction device comprising:
   a vibration detection device to detect vibration;
   a vibration reduction optical system to reduce the vibration by movement of the vibration reducing optical system;
   a vibration reduction optical system drive device to drive said vibration reduction optical system on the basis of a detection result of said vibration detection device; and
   a control device to effect, when the frequency of output of said vibration detection device falls within a predetermined frequency range, which is intrinsic to the vibration detection device, a control which is different from a control, which is effected when the frequency of output of said vibration detection device falls outside said predetermined frequency range.

28. A vibration detection device according to claim 27, wherein when the frequency of the output of said vibration detection device falls within said predetermined range, said control device locks said vibration reduction optical system with a lock device.

* * * * *